(No Model.)  4 Sheets—Sheet 1.

D. M. PFAUTZ.
SPRING PROPELLED VEHICLE.

No. 357,289.  Patented Feb. 8, 1887.

WITNESSES:

INVENTOR
Daniel M. Pfautz
by his attorney (No Model.)
D. M. PFAUTZ.
SPRING PROPELLED VEHICLE.
No. 357,289. Patented Feb. 8, 1887.
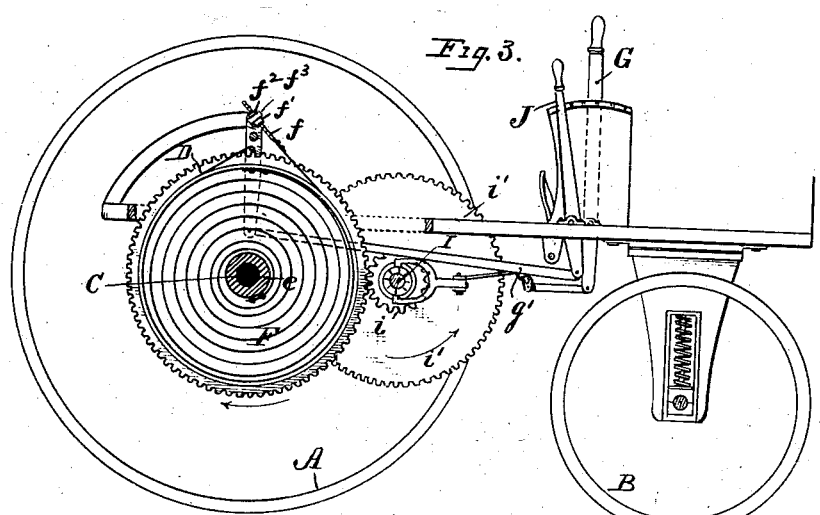
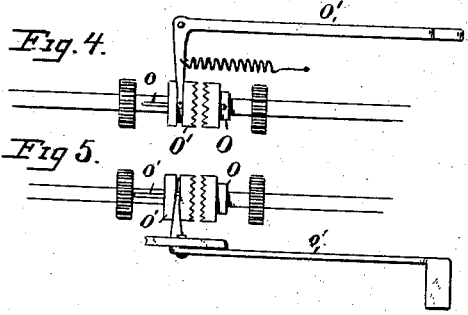
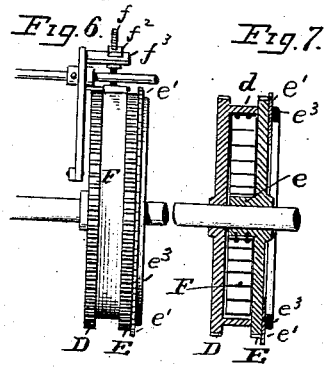
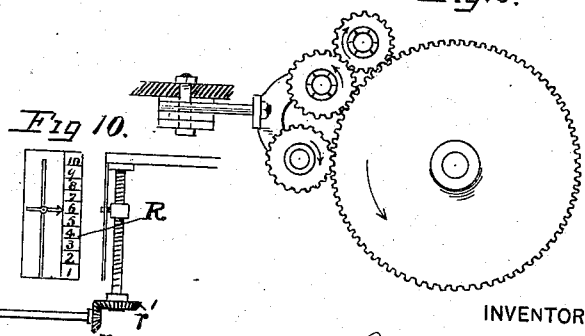
WITNESSES:
INVENTOR
Daniel M. Pfautz
by his attorney (No Model.)  
D. M. PFAUTZ.  
SPRING PROPELLED VEHICLE.

No. 357,289. Patented Feb. 8, 1887.

WITNESSES.  
H. W. Elmore  
Fred U. Fischer

INVENTOR.  
Daniel M. Pfautz  
by his attorney  
G. S. Harding (No Model.)  
4 Sheets—Sheet 4.

D. M. PFAUTZ.
SPRING PROPELLED VEHICLE.

No. 357,289. Patented Feb. 8, 1887.

WITNESSES:
Joshua Matlack, Jr.
Frank Crouse

INVENTOR
Daniel M. Pfautz
by his attorney
G. J. Harding

UNITED STATES PATENT OFFICE.

DANIEL M. PFAUTZ, OF PHILADELPHIA, PENNSYLVANIA, ASSIGNOR TO THE PHILADELPHIA LOCOMOTIVE VEHICLE AND STATIONARY MOTOR COMPANY, OF NEW JERSEY.

SPRING-PROPELLED VEHICLE.

SPECIFICATION forming part of Letters Patent No. 357,289, dated February 8, 1887.

Application filed May 10, 1886. Serial No. 201,744. (No model.)

*To all whom it may concern:*

Be it known that I, DANIEL M. PFAUTZ, a citizen of the United States, and a resident of Philadelphia, State of Pennsylvania, have invented a new and useful Improvement in Vehicles Propelled by Spring-Motors, of which the following is a true and exact description, due reference being had to the accompanying drawings, which form a part hereof.

By my invention I am enabled not only to construct a vehicle capable of being propelled by spring-motor power, but by several novel mechanical features I am enabled to so arrange the spring-motors and other parts of the vehicle that I can regain the power of the springs, and also by hand-power assist propulsion over steep grades, or propelled entirely by means of hand-power.

The vehicle or carriage to be propelled may be of the ordinary form, with the exception that the front wheel or wheels must be so arranged as to admit of being easily turned from the carriage-seat, to enable the vehicle or carriage to be guided in any direction desired.

Figure 1:
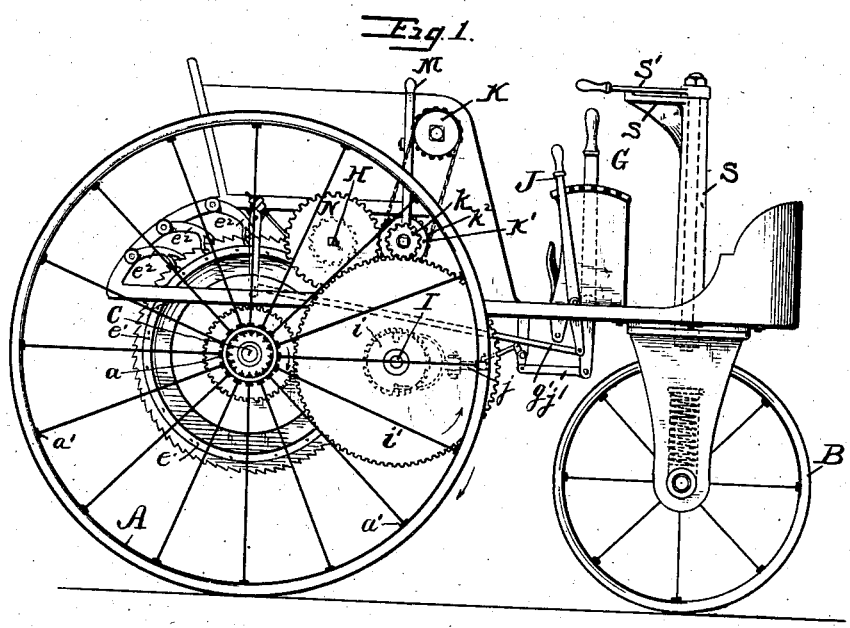
Figure 2:
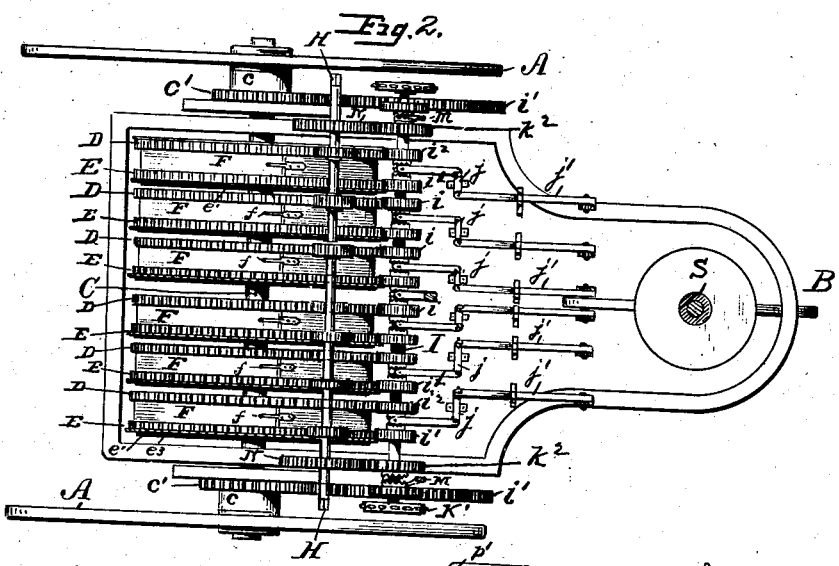
Figure 11:
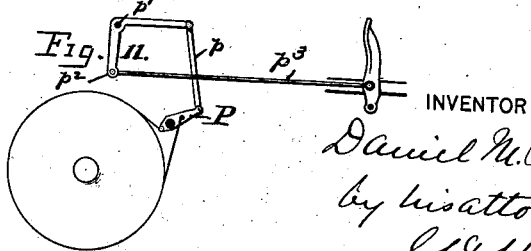
Figure 12:
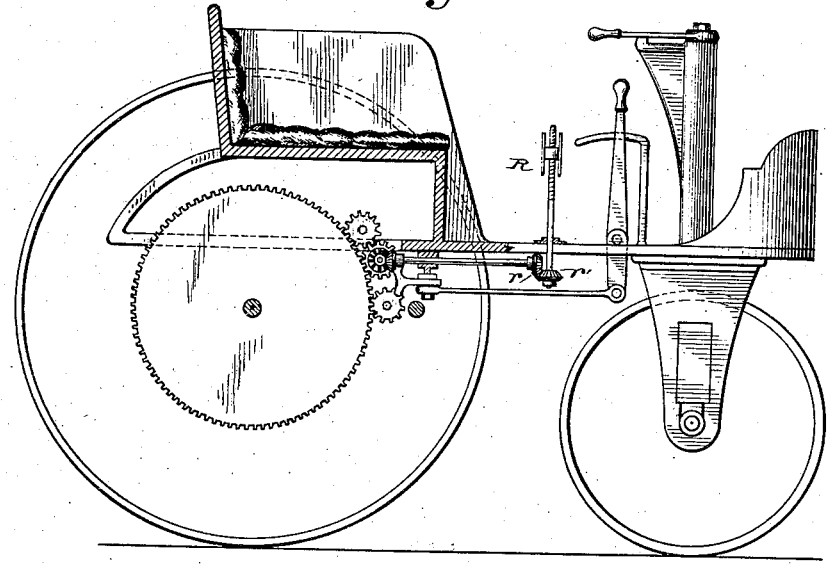
Figure 13:
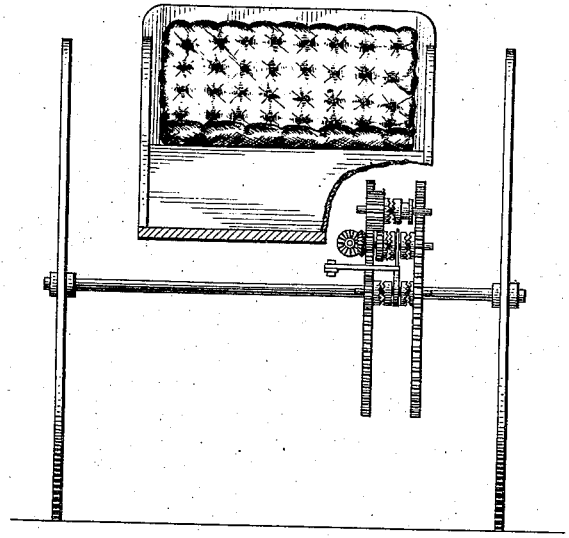
Figure 9:
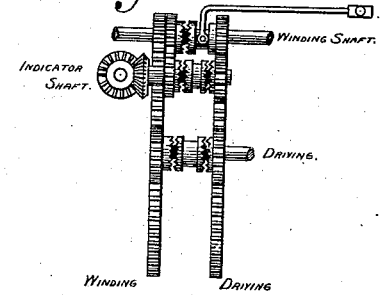
Figure 14:
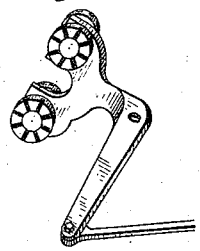
Figure 15:
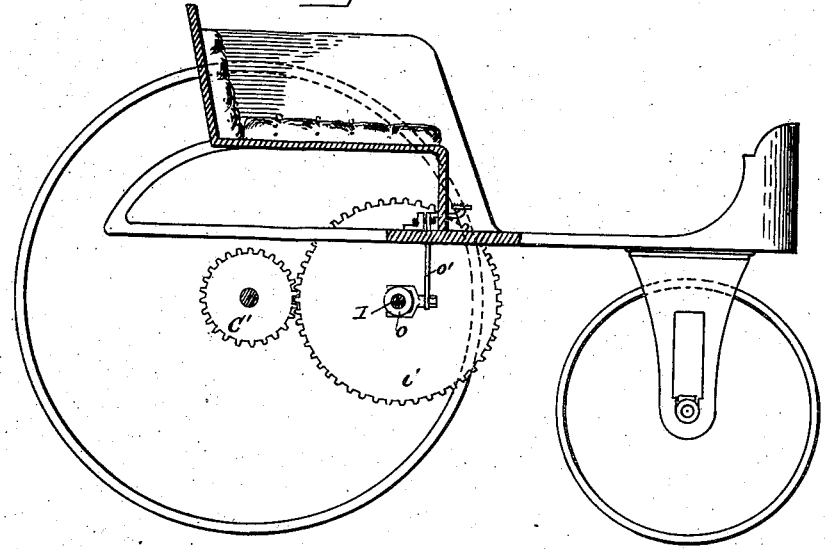
Figure 16:
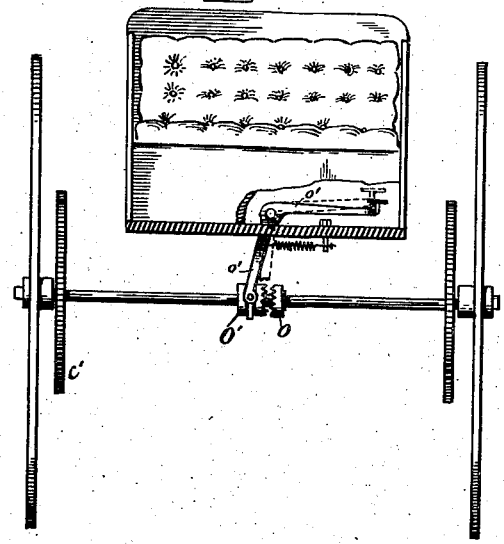
Figure 17:
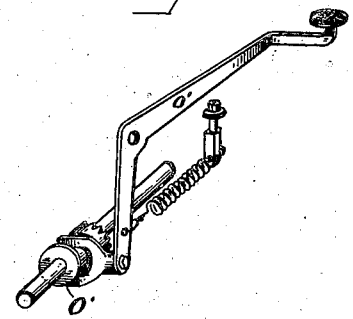

In the drawings, Figure 1 is an outside elevation of my carriage or vehicle. Fig. 2 is a plan view with seat removed and levers in section. Fig. 3 is a section showing operation of band-brake and steel motor-spring and clutch device. Figs. 4 and 5 show method of disconnecting the driving-shaft. Fig. 6 is an elevation showing winding driving-wheel and band-brake. Fig. 7 is a central section of same, showing rubber band for lugs to fall upon. Figs. 8, 9, and 10 show my indicator device; Fig. 11, a side elevation of wooden band-wheel brake with foot-lever connection. Figs. 12, 13, and 14 show the indicating device and method of operating the same. Figs. 15, 16, and 17 show the divided driving-shaft and the method of separating and connecting the two portions of the said divided shaft.

The vehicle, as shown in the drawings, is carried by three wheels, in which the rear wheels, A, are the driving-wheels and the front wheel, B, the guiding-wheel. These wheels are preferably made of steel and adjustable. The hub is flanged, through which the spokes, preferably made of steel, pass and are secured by means of nuts $a\ a$, one inside and the other outside of the flange. The outer end of the spoke fits into sockets in the rim of the wheel and is secured in place by means of nuts $a'$, as is shown in Fig. 1.

On the inside of the hub is a projection, $c$, to which is secured a spur-gearing, $c'$, Fig. 2, which transmits the power given by the spring-motors, to be hereinafter described, and by which motion is given to the vehicle.

The power to propel the vehicle is produced by a number of coiled bands of steel arranged upon the axle C. These bands of steel are each coiled in wheels D and E, forming a case for the band or spring, as shown in Figs. 6 and 7. One of these wheels, D, has a rim or flange, $d$, near the outer edge, the flange being the same width as the steel band. The other wheel, E, has a hub, $e$, also the same width as the steel band. The steel band is coiled in a novel manner, one end being secured to the outer rim or flange, $d$, of the wheel D, the other end being secured to the hub $e$ of the wheel E. It will be thus seen by this novel method of winding the steel band that the wheel E, which acts as the winding-wheel, and the wheel D, which acts as the driving-wheel, will both rotate in the same direction—that is, in winding or tightening the spring the winding-wheel E is revolved in the same direction as the driving-wheel D is when said spring is loosened, so as to revolve said driving-wheel D.

On the outside of the rim or flange $d$ is an adjustable band-brake, F, being more clearly shown in Fig. 3. This band-brake is made adjustable by means of threaded end $f$ and nut $f'\ f^2$, working upon a lug, $f^3$. These adjustable band-brakes are operated by means of levers G, equal in number to the springs used in the carriage or vehicle. These levers are placed in the front of the carriage, as seen in Figs. 1 and 3, and are connected with the adjustable band-brakes F by the link-connection $g'$.

Both wheels D and E have spur-gearing on their outer edges, the wheels D being the driving and wheels E being the winding-wheels. The winding-wheels E have ratchet-flanges $e'$ on the side of the spur-gearing, into which pawls $e^2$ drop and prevent the wheel revolving in an opposite direction, as is shown, Fig. 1. These pawls have a lug projection, which drops upon a rubber projection, $e^1$, on the wheel E at the same time the said pawls drop into the ratchet, so as to prevent the noise of the striking pawls from becoming disagreeable, as shown in Fig. 7. The spring is wound upon the winding-wheel E by means of a pinion geared into it on the winding-shaft H. This shaft H is suspended from the bottom of the carriage by any suitable means. This shaft extends to both sides of the carriage, said shaft having at each end a shank, upon which a crank can be placed in order to wind the said spring. The spring, being once wound to any desired tightness, remains at rest until the band-brake F on the driving-wheels D is released. When this brake is released, the driving-wheels D will commence to revolve from the tension of the springs. The driving-wheels D revolve upon the axle C, being geared into a series of small pinions, $i$, secured to driving-shaft I. Upon the ends of said driving-shaft I is rigidly secured a large spur-wheel, $i'$, which is geared into the spur-wheels $c'$, and thus revolves the main axle of the carriage. This driving-shaft I is also suspended from the bottom of the carriage by any suitable means. Upon the driving-shaft I are also pinions $i^2$, normally running idle, connecting with the winding-wheels by spring-clutch, as shown in Fig. 2. These pinions ordinarily run idle; but when there is excess of motion—as, for example, when the carriage or vehicle is moving down a grade—then, by means of the levers J, equal in number to the spring-motors used, as shown, Fig. 1, and in the front of the carriage or other vehicle, and the bell-crank lever $j$ and link $j'$, I am enabled to throw these pinions $i^2$, or any of them, into connection with the winding-wheels E, and thus the excess of motion is used to wind up the springs and renew the power. In the arm of the seat of the carriage I also place a wheel, K, which is so arranged that I can attach to it a crank. This wheel K is connected to another wheel, K', by means of chain gearing. This wheel K' carries upon its shaft a pinion, $k$, which is normally geared into the spur-gearing $i'$ on the driving-shaft, so that I am enabled, while sitting in the carriage, to assist in the propulsion of the vehicle, and if, for any reason, the spring-motor power should entirely cease, I am enabled to propel the vehicle by hand-power.

Upon the same shaft and behind the pinion $k'$ is a larger pinion, $k^2$, which can be shifted by means of a clutch-lever, M, in gear with the pinion N on the winding-shaft, to tighten the springs and store up power while sitting in the seat.

I construct my driving-shaft in two sections, connected together at the center by means of a spring-clutch, as shown in Figs. 4 and 5. This spring-clutch is constructed in the following manner: One clutch, O, is rigidly secured on one portion of the driving-shaft, while the other, O', slides upon a key, $o$, upon the other portion of the shaft. This spring-clutch is operated by means of the levers connecting with a spring foot-treadle, $o'$, extending up in front of the seat. By placing the foot upon the spring-treadle the spring-clutch is released and the driving-shaft is separated into two sections. This enables me to pass around very sharp curves and also pass around curves at greater speed. Directly back of the spur-gear wheel $c'$ is a wooden brake-wheel, rigidly secured to the axle C. On these wooden wheels are placed adjustable band-brakes. (Shown in Fig. 11.) These band-brakes are constructed similarly to the adjustable band-brake heretofore explained. These band-brakes are connected to a shaft running across the carriage, and connect the brakes on the two rear wheels. Running across the carriage directly in front of the wooden band-brake wheels is a shaft. Pivoted upon said shaft at either end are two short levers, P, to which the ends of the band-brake are connected by means of pins. These levers P are operated by means of links $p$, connected with the arms of the rock-shaft $p'$, to the center of which is secured a depending arm, $p^2$, to which a link, $p^3$, is connected with the spring foot-treadle, as shown in Fig. 11. By placing the foot upon this treadle the speed may be regulated at the will of the driver, and the brake is released by removing the foot from the treadle.

To enable the driver at any time to judge the amount of power in any one of the springs, I place on the front of each quadrant holding the levers in front of the rider's seat in the carriage or vehicle a series of graded indicators, R, as shown in Fig. 10, equal in number to the winding-shafts. This indicator is moved up and down by means of the power which is transmitted by the bevel-gearing $r\ r'$, which is connected to the driving-wheel D and winding-wheel E.

As the driving and winding wheels both move in the same direction, it is necessary to provide intermediate gearing which will reverse the direction of the motion derived from either the driving or winding wheel. I do this in the following manner: The indicator mechanism before described is directly connected with the driving-wheel D, and therefore is moved in the same direction; but it is moved by the winding-wheel E by means of two gear-wheels, one of which receives motion directly from the winding-wheel, and then this wheel moves the second wheel in an opposite direction and moves the indicator-shaft in the same direction as the second wheel, but in an opposite direction to that of the driving-shaft, as is shown in Figs. 8 and 9.

The front wheel, B, of the carriage is operated in the following manner: On the front of the carriage or vehicle is a hollow post, S, in which is a shaft, by which the bracket which carries the front wheel is operated. At the top of the shaft S is placed a segmental projection, $s$, upon which a lever-arm, $s'$, capable of being extended to any desired length, is secured. This lever $s'$ is secured to the top of the vertical shaft S. The driver, while seated, by moving this lever, may guide the carriage in any desired course, and the lever being capable of extension, it will accommodate itself to the position desired by the rider.

Having now described my invention, what I claim as new, and desire to secure by Letters Patent, is—

1. In a carriage or other vehicle propelled by spring-motors, a series of spring-motors secured upon the main axle, said spring-motors consisting of steel bands coiled within two wheels, one wheel having a flange, the other wheel a hub, said hub and flange being each equal in width to the width of the steel bands, one end of said band being secured to the hub of one wheel and the other end of said band being secured to the flange of the other wheel, said wheels being constructed to move freely upon their axles when in operation, said wheels both revolving in the same direction, and the spring in operation becomes uncoiled from its outer surface, substantially as and for the purpose specified.

2. In a carriage or other vehicle propelled by spring-motors, a series of spring-motors constructed as described, in combination with a band-brake, one end of said band-brake being attached to a stationary rod in the lever and the other end passing through the other end of the lever through a swinging rod, with means for adjusting said last-mentioned end of the band-brake, said band-brake being operated by means of levers placed in front of the carriage, substantially as and for the purpose specified.

3. In a carriage or other vehicle propelled by spring-motors, a series of spring-motors secured upon the main axle, said spring-motors consisting of steel bands coiled within two wheels, one wheel having a flange, the other wheel a hub, said hub and flange being each equal in width to the width of the steel bands, one end of said band being secured to the hub of one wheel and the other end of said band being secured to the flange of the other wheel, said wheels being constructed to move freely upon their axles when in operation, said wheels both revolving in the same direction, and the spring in operation becomes uncoiled from its outer surface, the hubbed wheel, which acts as the winding-wheel, having upon the side of the spur-gearing ratchet-flanges, into which pawls drop for the purpose of preventing rotation in more than one direction, substantially as and for the purpose specified.

4. In a carriage or other vehicle propelled by spring-motors, a series of spring-motors secured upon the main axle, said spring-motors consisting of steel bands coiled within two wheels, one wheel having a flange, the other wheel a hub, said hub and flange being each equal in width to the width of the steel bands, one end of said band being secured to the hub of one wheel and the other end of said band being secured to the flange of the other wheel, the hubbed wheel, which acts as the winding-wheel, having upon the side of the spur-gearing ratchet-flanges, into which pawls drop for the purpose of preventing rotation in more than one direction, said pawls having lug projections which drop upon rubber projections on the winding-wheel at the same time the said pawls drop into the ratchet, substantially as and for the purpose specified.

5. In a carriage or other vehicle propelled by spring-motors, a series of spring-motors secured upon the main axle, said spring-motors consisting of steel bands coiled within two wheels, one wheel having a flange, the other wheel a hub, said hub and flange being each equal in width to the width of the steel bands, one end of said band being secured to the hub of one wheel and the other end of said band being secured to the flange of the other wheel, on which the hubbed wheel acts as the winding-wheel, in combination with pinions fixed upon a shaft suspended from the bottom of the vehicle, said pinions working into the spur-gearing on the winding-wheels, said shaft, which carries the pinions, running across the vehicle, and having upon its ends shank projections upon which cranks can be placed for the purpose of winding the springs, substantially as and for the purpose specified.

6. In a carriage or other vehicle propelled by spring-motors, a series of spring-motors secured upon the main axle, said spring-motors consisting of steel bands coiled within two wheels, one wheel having a flange, the other wheel a hub, said hub and flange being each equal in width to the width of the steel bands, one end of said band being secured to the hub of one wheel and the other end of said band being secured to the flange of the other wheel, said wheels, which have a flange-projection, acting as driving-wheels, said driving-wheels being geared into a series of small pinions secured to the driving-shaft, said driving-shaft being suspended from the bottom of the vehicle, in combination with large spur-wheel secured on ends of said driving-shaft, and spur-wheels secured upon the main axle, into which the spur-wheel on the ends of the driving-shaft is geared, all constructed and acting substantially as and for the purpose specified.

7. In a carriage or other vehicle propelled by spring-motors, the combination of pinions $i'$, normally running idle and secured upon the driving-shaft I, and a spring-clutch operated by levers J in front of the vehicle, bell-crank levers $j$, and links $j'$, for the purpose of connecting any one or all of said pinions with gearing upon the winding-wheels, substantially as and for the purpose specified.

8. In a carriage or other vehicle propelled by spring-motors, wheels K, placed in the arms of the seat of the vehicle and so arranged that a crank can be attached to it, said wheels being connected by chain gearing with wheels K′, said wheels K′ carrying upon them shaft-pinions $k$, said pinions $k$ being normally geared into the spur-gearing $i'$ on the driving-shaft, substantially as and for the purpose specified.

9. In a carriage or other vehicle propelled by spring-motors, the pinion $k^2$, secured upon the same shaft as pinions K', said pinion $k^2$ being capable of being shifted in gear by means of clutch-lever M, with pinion N, secured upon the winding-shaft, substantially as and for the purpose specified.

10. In a carriage or other vehicle propelled by spring-motors, a clutch for the purpose of connecting or separating the driving-shaft, constructed in two sections, consisting of clutch O, rigidly secured to one portion of said driving-shaft, while clutch O' slides upon key $o$ upon the other portion of the shaft, substantially as and for the purpose specified.

11. In a carriage or other vehicle propelled by spring-motors, a clutch for the purpose of connecting or separating the driving-shaft, constructed in two sections, consisting of clutch O, rigidly secured to one portion of said driving-shaft, while clutch O' slides upon key $o$ upon the other portion of the driving-shaft, said spring-clutch being operated by means of levers connecting with a spring foot-treadle, $o'$, extending up in front of the driver's seat, substantially as and for the purpose specified.

12. In a carriage or other vehicle propelled by spring-motors, the wooden brake-wheels having placed upon them adjustable band-brakes, said band-brakes being connected with a shaft running across the vehicle, said shaft connecting the brakes on the two rear wheels, and a shaft running across said vehicle in front of said shaft, which connects said band-brakes, pivoted on said last-mentioned shaft being levers P, operated by links $p$, connected with the arms of rock-shaft $p'$, having dependent arm $p^2$, secured to it at its center, said arm $p^2$ being connected with a spring foot-treadle by means of link $p^3$, all constructed and acting substantially as and for the purpose specified.

13. In a carriage or other vehicle propelled by spring-motors, an indicator device which consists of the combination of indicator R and bevel-gearing $r\ r'$, said bevel-gearing being connected with the winding and driving wheels, substantially as and in the manner and for the purpose specified.

DANIEL M. PFAUTZ.

Witnesses:
RICHD. S. CHILD, Jr.,
JOSHUA MATLACK, Jr.